UNITED STATES PATENT OFFICE.

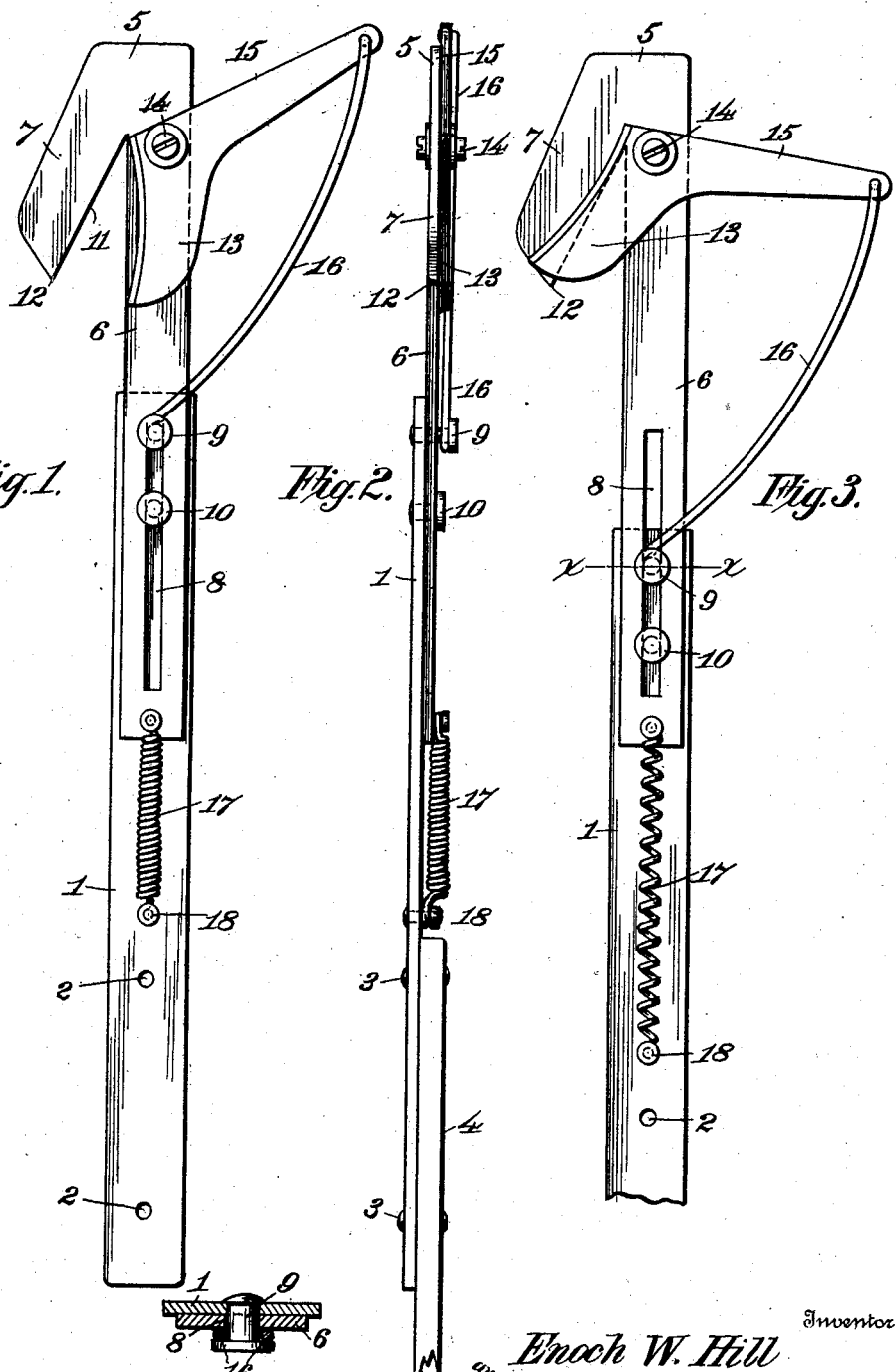

ENOCH W. HILL AND CHARLES H. YOUNG, OF CENTER BARNSTEAD, NEW HAMPSHIRE.

PRUNING-HOOK.

992,561. Specification of Letters Patent. Patented May 16, 1911.

Application filed March 25, 1910. Serial No. 551,490.

*To all whom it may concern:*

Be it known that we, ENOCH W. HILL and CHARLES H. YOUNG, citizens of the United States, and residents of the city of Center Barnstead, county of Belknap, and State of New Hampshire, have invented certain new and useful Improvements in Pruning-Hooks, of which the following is a specification.

Our invention relates to pruning hooks and particularly to pruning hooks adapted to be operated with one hand by merely pulling on the handle.

The object of our invention is to provide an improved pruning hook of the class mentioned which shall also be adapted for use in picking obnoxious insects from trees, such as the brown-tail-moth, etc.

A further object of our invention is to provide a pruning hook of the class mentioned which shall be of simple construction, easy to operate and which shall not readily get out of order.

A further object of our invention is to provide a pruning hook having a stationary and a movable blade and means for operating the movable blade whereby a limited yielding pressure may be exerted thereon.

Other objects of our invention will appear hereinafter.

With these objects in view our invention consists generally in a device of the class mentioned comprising an elongated member, and a hook member slidably mounted thereon, the hook member comprising a slotted shank and a sharpened blade, the slotted shank lying parallel with said elongated member and guides on said member extending through the slot in the shank of the hook. Pivotally mounted on the hook member is a movable blade having an arm or extension and a link connects the outer end of said arm with a stationary portion on the first said member, preferably one of the guides. The link comprises a member of such construction as to exert a limited yielding pressure to the movable blade which prevents sudden shocks to the blades when in use. The lower end of the stationary blade, that is the hook proper, is pointed and the movable blade is adapted to move laterally or substantially horizontally through the first portion of its movement whereby the device is particularly adapted for picking insects from the trees as will be fully described hereinafter.

Our invention further consists in various details of construction and arrangements of parts all as will be fully described hereinafter and particularly pointed out in the claim.

Our invention will be more readily understood by reference to the accompanying drawings forming a part of this specification and in which—

Figure 1 is a side view of a pruning hook embodying our invention in its preferred form, the blades being shown in open position. Fig. 2 is an edge view of the device. Fig. 3 is a side view illustrating the blade in closed position, and Fig. 4 is an enlarged transverse section taken on the line $x$—$x$ of Fig. 3.

Referring now to the drawings 1 indicates an elongated member which preferably consists of a flat strip of metal provided near one end with perforations 2 to receive screws or rivets 3 by which it is secured to a handle 4. Longitudinally slidable on the member 1 is a hook member 5 which comprises a shank 6 and a blade 7. The shank 6 is provided with a longitudinally disposed slot 8 through which extend headed pins or lugs 9 and 10. Said pins or lugs are secured to the member 1 and form guides for the hook member. The blade 7 extends backwardly or downwardly at an acute angle and is formed with a straight sharpened edge 11. The lower end of the blade 7 is cut back forming a point 12 the purpose of which will be described hereinafter.

13 indicates a movable blade which is pivotally secured to the shank 6 adjacent the apex of the angle of the hook upon a bolt or rivet 14. The blade 13 is provided with an arm 15 formed integrally therewith and extending outwardly from said blade at an angle thereto and upon the opposite side of the device from the blade 7. The outer end of the arm 15 is connected to the pin 9 by a link 16.

In using the device for pruning the hook 5 is hooked over the branch to be trimmed and a pull is exerted on the handle 4. This causes the parts 1 and 6 to slide relatively to each other. As the link 16 is secured to the member 1 the blade 13 is actuated. In order to prevent undue and sudden shocks to the blades due to a sudden pull on the handle we prefer that the link 16 shall be of such construction as to exert a yielding force on the blade for a limited period. To this end we form the link of a strip of spring metal or stout spring wire and curve the same as shown. When cutting twigs or small branches the strength of the link 16 will actuate the blade 13 without straining said link, but should unusual resistance be offered to the blade the blade will partially yield but will exert an increasing force as the link 16 assumes a straight line or position. When the pull on the handle is relieved the parts are restored to normal position by a spring 17 one end of which is connected to one end of the shank 6 and the other end to a pin or lug 18 of the member 1.

In using the device to pick insects from the branches of the trees the point 12 is rested on the branch with the hook extending across the insect and a slight pull exerted on the handle which will actuate the blade 13 to catch or destroy the same.

Having described our invention what we claim as new and desire to secure by Letters Patent is:

In a device of the class described, an elongated member and a hook member, said hook member comprising a shank and a straight blade at an acute angle thereto, the end of said blade being pointed and said shank being longitudinally slotted and slidably mounted on said elongated member, headed pins on said elongated member extending through said slot and forming guides for the hook, a spring for normally maintaining said hook in retracted position, a concavely curved blade pivotally mounted adjacent the first said blade, an arm on said pivotally mounted blade and a link connecting said arm and one of said pins, said link comprising a curved resilient member, substantially as described.

In testimony whereof we have signed our names to this specification in the presence of subscribing witnesses.

ENOCH W. HILL.
CHARLES H. YOUNG.

Witnesses:
JAMES W. FERRIN,
HOWARD C. PRESCOTT.

Copies of this patent may be obtained for five cents each, by addressing the "Commissioner of Patents, Washington, D. C."